April 4, 1950

E. W. REICHART 2,503,069

STATIONARY AND ROTARY CUTTER FOR CUTTING SEED POTATOES

Filed April 12, 1946

Inventor
Earl W. Reichart

By Wilfred Lowry
Attorney

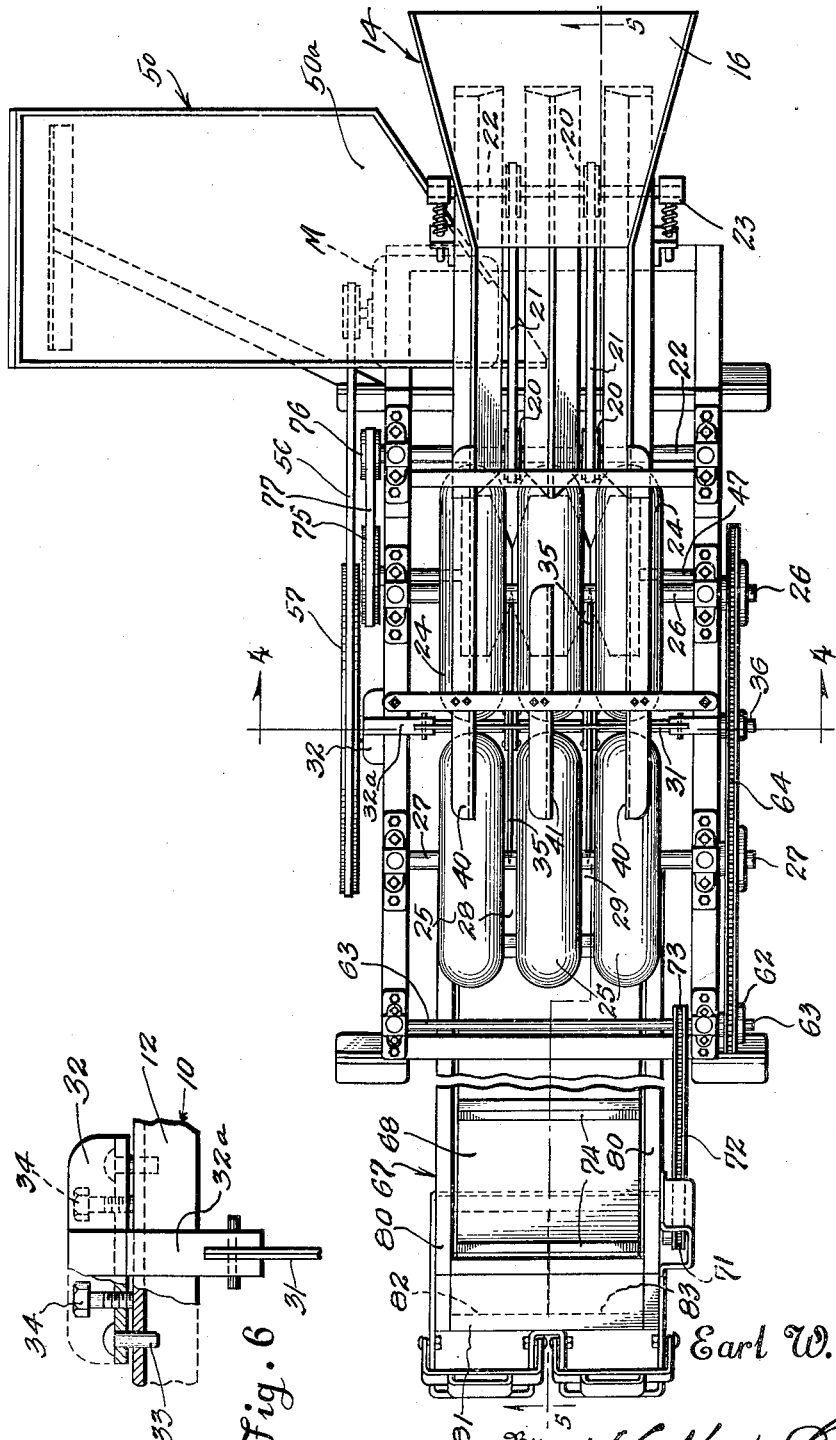

April 4, 1950 — E. W. REICHART — 2,503,069
STATIONARY AND ROTARY CUTTER FOR CUTTING SEED POTATOES
Filed April 12, 1946 — 4 Sheets-Sheet 3
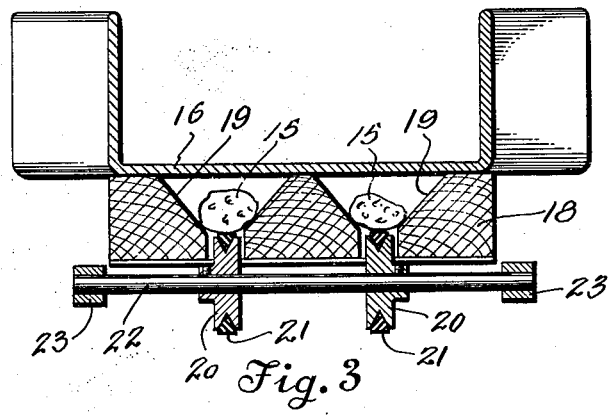
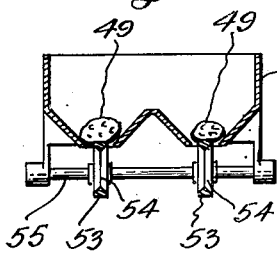
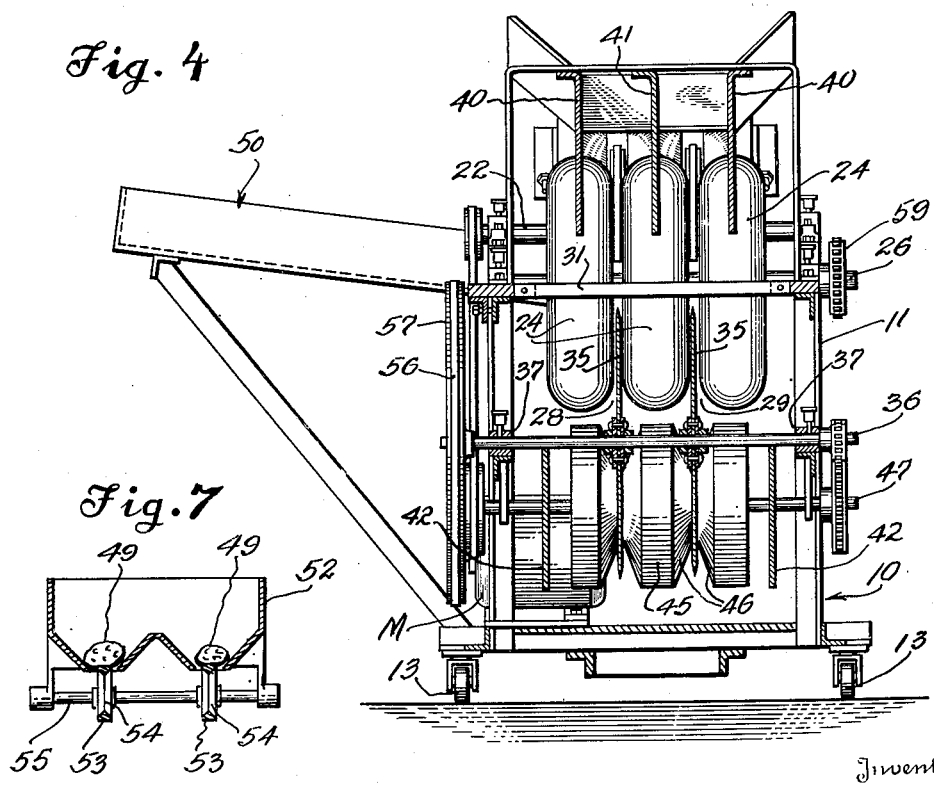
Inventor
Earl W. Reichart April 4, 1950

E. W. REICHART
STATIONARY AND ROTARY CUTTER
FOR CUTTING SEED POTATOES 2,503,069

Filed April 12, 1946

Inventor
Earl W. Reichart

By Wilfred E. Laury
Attorney

Patented Apr. 4, 1950

2,503,069

UNITED STATES PATENT OFFICE 2,503,069

STATIONARY AND ROTARY CUTTER FOR CUTTING SEED POTATOES

Earl W. Reichart, Hanover, Pa.

Application April 12, 1946, Serial No. 661,791

2 Claims. (Cl. 146—78)

The present invention relates to a machine for slicing fruit in general but more particularly for cutting seed potatoes into halves and quarters in one operation and has as one advantage cutting them accurately at a high rate of speed, thereby possessing considerable advantage over such machines now in use.

A further object of this invention is to produce a machine of this class that is simple in construction and can be manufactured at low cost and is easy to operate.

Another object of this invention is also to grade the potatoes, so that only potatoes of large size will be cut into quarters while smaller potatoes below a certain size will pass through the machine and be cut into halves.

These and other objects and advantages will be readily understood from the following disclosure with the aid of the attached drawings forming part of this invention.

In the drawings, like reference numerals relate to the same details in the different views;

Figure 2 is a top plan view thereof;

Figure 3 is a view in transverse section taken on a plane along line 3—3 of Figure 1;

Figure 4 is a similar view taken on a plane along line 4—4 of Figure 1;

Figure 6 is a fragmentary top plan view and partial section of a detail for mounting one of the cutting knives; and Figure 7 is a view similar to Figure 3 taken on a plane along line 7—7 of Figure 1.

Figure 1:
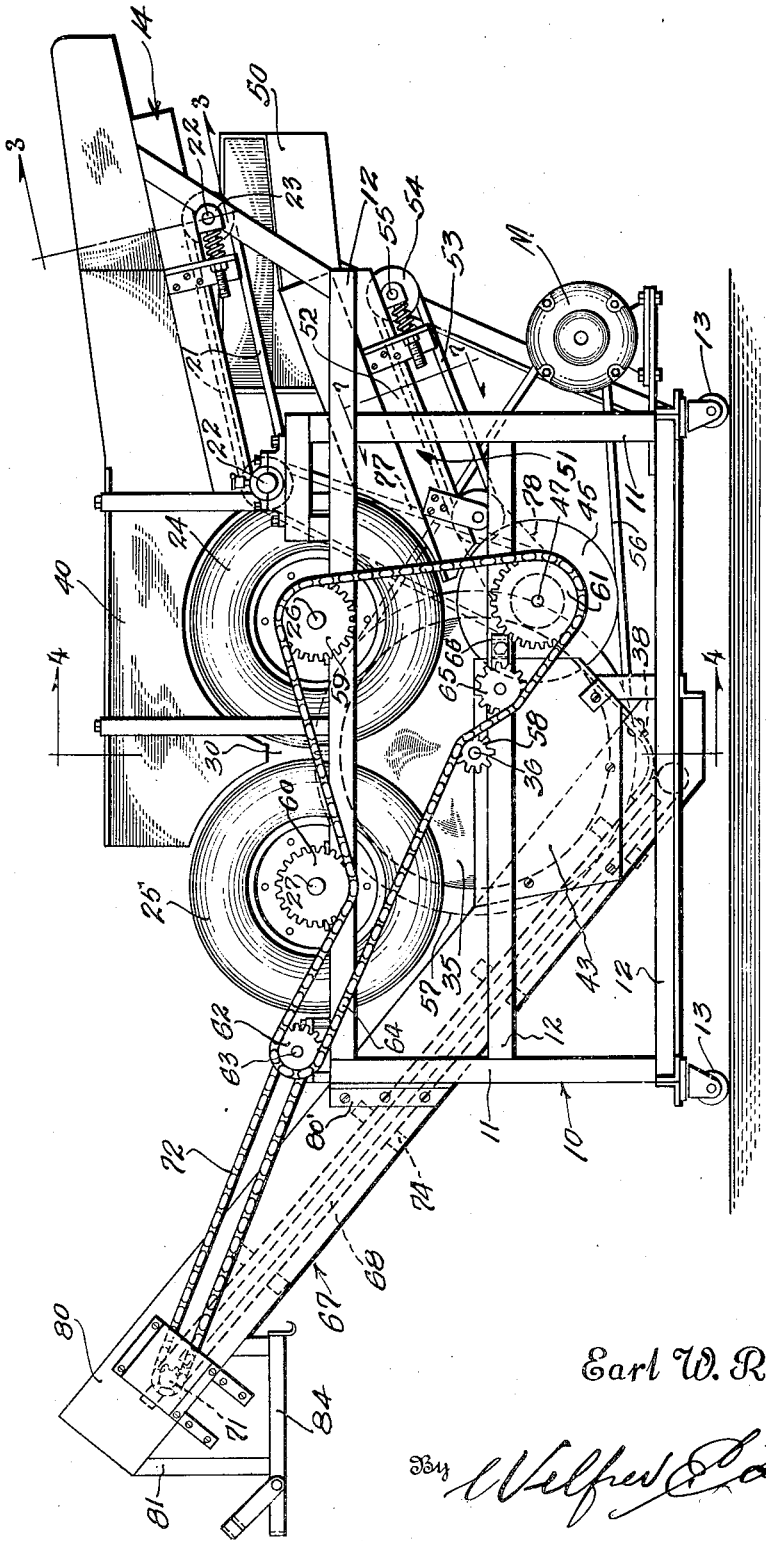
Figure 1 is a side elevation showing the right side of the potato cutter.

In the drawings, reference numeral 10 in general represents a portable, structural, rectangular stand made principally of upright and horizontal L-shaped iron bars 11 and 12, suitably connected as by welding or riveting.

Figure 5:
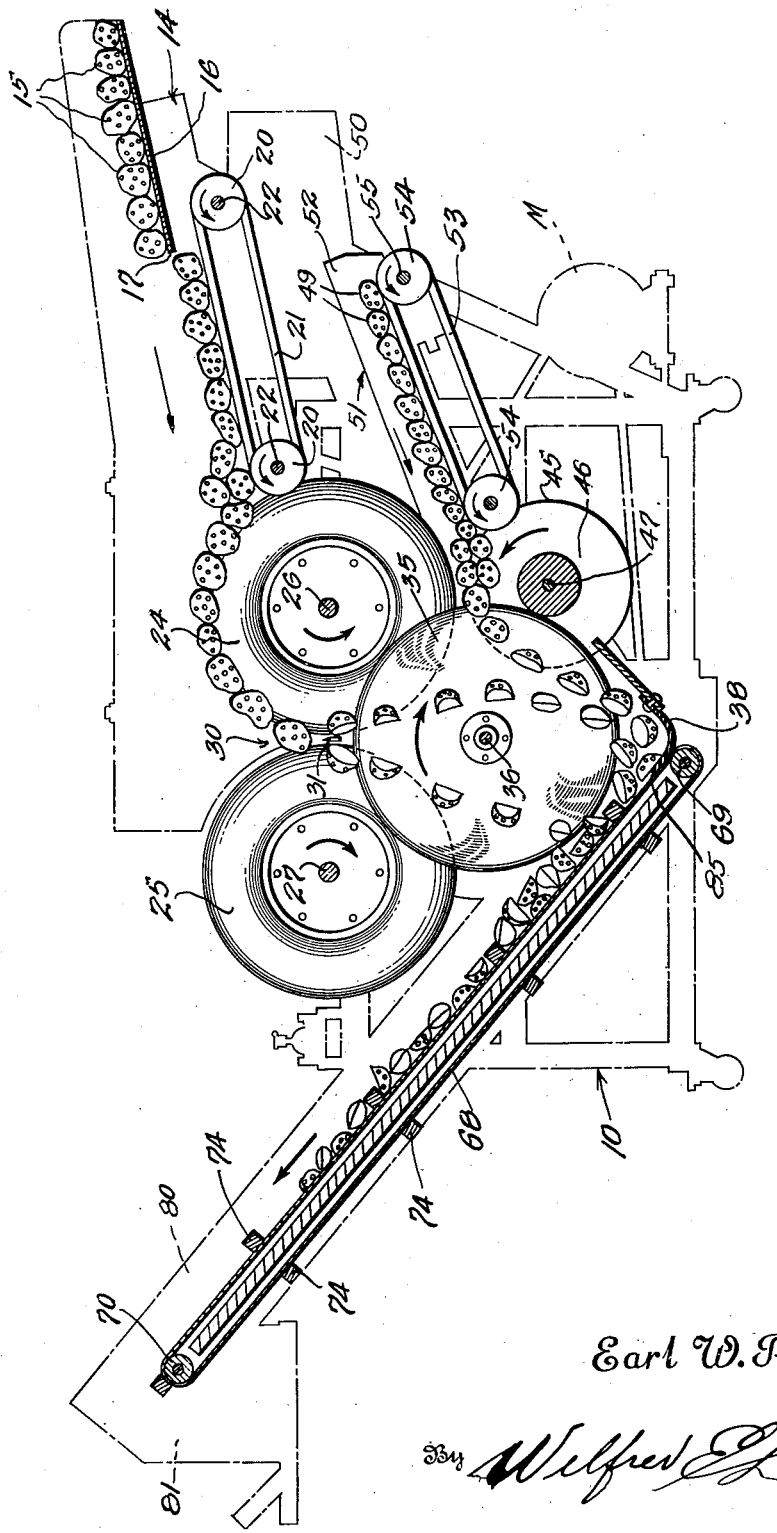
Figure 5 is a view in longitudinal section taken on a plane along line 5—5 of Figure 2.

For easy transportation the stand is preferably mounted on casters 13. At the top of this structure 10 or at the right hand end of Figures 1 and 5, is shown a slanting trough or hopper 14 for large potatoes 15 to be cut. The entering end of the hopper is channel-shaped and has an inclined flat floor plate 16 onto which the large potatoes 15 are deposited. This flat bottom terminates a short distance inwardly from the entering end. Below this flat floor 16 and extending a considerable distance beyond the inner edge 17 thereof a bottom 18 is provided with two parallel V-shaped grooves 19, narrowing towards the slit bottom, see Figure 3. Into each of the slit grooves projects from below a pair of pulleys 20 with grooved edges in which V-shaped section belts 21 run, for advancing the large potatoes. These pulleys are carried on transverse shafts 22 mounted in bearings 23 on the stand 10 below the bottom 18.

Adjacent the delivery end of the grooved bottom 18 of the hopper 14 are placed three pairs of large feeder wheels 24 and 25 which are mounted in tandem on shafts 26, 27. In this manner two spaces 28 and 29 are formed between the middle and the side pairs of the wheels 24 and 25 which spaces register with the bottom grooves 19 and the V-belts 21 in order to carry the large potatoes 15 over the nearest wheels 24 into the dip 30 between the same and its mate 25. As each pair of wheels 24, 25 rotate oppositely, as indicated by arrows in Figure 5, the peripheral surfaces of said wheels will thus assist each other to squeeze the large potatoes downwardly through the same. In passing therethrough the large potatoes 15 will encounter a knife blade 31.

This blade is stretched through said dip 30 between the side bars of the structural stand 10 by brackets 32a which form parts of the hangers 32 adjustably secured on the stand 10 by means of studs 33 and set screws 34, see Figures 2 and 6.

It should be noted that the feeding wheels 24, 25 may be made of any suitable material in order to obtain sufficient friction to advance the potatoes for cutting, but if rubber is available, these wheels may consist of rubber tires. This is the operation to cut large potatoes into halves.

In addition to the straight knife blade 31, two rotatable disk-blades 35 are provided, one in each of the spaces 28 and 29 between the feeding wheels 24, 25 and carried on a transverse shaft 36 positioned in a vertical plane through the knife blade 31 below said wheels. The shaft 36 is mounted to revolve in bearings 37, one on each side of the structural stand 10, see Fig. 4, where now the halves of the potatoes encounter the rotating blades 35, and are cut a second time. The large potatoes have thus been quartered and drop down in the tray 38 below the disk blades 35.

Suitably suspended in the stand 10, lengthwise thereof is a pair of side partitions 40 and a central partition 41 situated in the vertical plane of the feed wheels 24 and 25 which partitions constitute guides registering with the troughs or grooves 19 of the hopper 14.

Likewise, similar guides or partitions 42 are suspended below the feed wheels 24, 25 at a distance apart corresponding to the outer vertical side surfaces of the said wheels 24, 25. The purpose of partitions 42 is now to guide the small size potatoes onto a wide roller 45 provided with two peripheral, deep grooves 46 of V-shape. This roller is preferably made of wood or plastic or, if rubber is available, three single rubber tired wheels can be mounted for turning on a transverse shaft 47 in the stand 10 provided with suitable bearings therefor.

The small size potatoes are fed onto the grooved roller 45 from a second hopper 50 which is mounted below the first hopper 14 on one side of the stand 10. This second hopper 50 has a flat inclined bottom 50a which empties near the middle of the stand 10 onto a pair of guide troughs 51 with downwardly inclined side plates 52, see Figure 7, having their edges spaced apart to form an open slot in which travels a V-shaped sectioned belt 53 which runs over V-grooved pulleys 54. A pair of transverse shafts 55 with suitable tensioning means are mounted on brackets in the stand 10.

Near the bottom of the stand is provided an electric motor M which has driving connection preferably by means of a belt 56 with a main pulley 57, mounted on shaft 36 which also carries the knife disks 35 and a small pinion 58 at one end. Other sprocket wheels 59 and 60 are secured on the feed wheel shafts 26 and 27, while a third sprocket wheel 61 is secured on the feed roller shaft 47 and a fourth sprocket wheel 62 secured on the conveyor shaft 63 at the delivery end of the stand 10. This train of sprocket wheels are all connected and actuated by the main drive sprocket chain 64, see particularly Figure 1. Accordingly, when the motor is started the feed wheels 24, 25 will rotate as well as the cutting discs 35, the feed roller 61 and the shaft 63 for the delivery conveyor.

A tensioning device for the sprocket chain 64 is indicated at 65 in order to stretch it, and this sprocket wheel 65 is therefore mounted on a sliding ratchet bar 66 as seen in Figure 1.

In order to run the elevator 67, which consists of an endless conveyor belt 68 running on end rollers 69, 70 at a steep inclination, another sprocket wheel 71 is furnished on the roller 70 at the upper end of the run with a sprocket chain 72 connecting said sprocket wheel with the corresponding wheel 73 on the conveyor shaft 63, see Figures 1 and 2. Transverse slats 74 are provided on the conveyor belt 68.

For moving the transfer belts 21 of the hopper 14, pulleys 75 and 76 connected by V-belts 77 are provided respectively on the shaft 47 and the forward roller shaft 22. Likewise, the transfer belts 53 of the main hopper are moved by pulleys and V-belts 78 from the feed roller shaft 47.

The elevator belt 68 is mounted between two upwardly slanting wall members or stiff boards 80 which are secured rigidly on the delivery end of the machine 10 and reinforced by angle irons 80'. The lower end of this elevator registers with the adjacent, open edge of the receiving trough 38 in order to collect sliced potato pieces.

At the upper end of the elevator 68, 80 is provided a bagging box 81 preferably divided into two compartments 82, 83 and beneath the box 81 is provided a clamping member 84 adapted for securing a bag under each compartment. By clamping one sack under one compartment, while a sack is being filled, the operation is continuous.

The operation of this machine is the following: After the potatoes to be sliced have been assorted as to size, large potatoes 15 are being fed to the plate 16 of the upper hopper 14 while small size potatoes 49 are deposited in the lower hopper 52. By now starting the motor 55 all movable parts are simultaneously set in motion.

The large size potatoes start to move down the inclined bottom 16 of the upper hopper and fall into the grooved bottom 18 so as to be further advanced by the belt 21 in between the sides of the feed wheels 24, 25 into the dip 30 between their peripheries. By the latter the potatoes 15 are then squeezed against the sharp knife blades 31 to be cut in two thereby. The two potato halves are then caught by the rapidly revolving knife 35 again to be halved. Thus the large potatoes have been quartered and fall down into the bottom tray 38.

Simultaneously small sized potatoes 49 in the lower hopper 52 are advanced towards the grooved feed roller 45, which forces them against rotating knife-discs 35 which cut them in halves, whereupon they also fall down into the tray 38 and mingle with the quartered large size potatoes 15. It will be noted that potatoes could be cut in halves by the use of the hopper and the rotating disk knife alone or by the upper hopper and the transverse knife alone.

As all the sliced potatoes are now crowded in the tray 38, they fall over the edge 85 thereof onto the elevator belt 68 which, by means of the slats 74 then carry the halved and quartered mixed potatoes to deliver them all into the box 81, there to be deposited in bags hung beneath.

From the foregoing description it is thought to be obvious that a potato grader constructed in accordance with my invention is particularly well adapted for use by reason of the convenience and facility with which it may be assembled and operated.

I claim:

1. A machine for dividing fruits into sections, comprising two pairs of feeder wheels, the wheels of one pair being in relatively close side by side relation with the wheels of the other pair, the wheels of each pair having treads in closely spaced opposed relation, means supporting the wheels of the two pairs for rotation on fixed parallel axes, means for rotating the wheels of each pair oppositely to one another, the adjacent portions of the treads of the two pairs of wheels forming a fruit receiving space, means for feeding fruit downwardly into said space, a disk knife rotatably supported for turning on an axis disposed below and in a plane passing vertically between the opposing treads of the two pairs of wheels whereby the disk knife lies between the wheels of the two pairs and has its top edge disposed in said fruit receiving space, a wheel having an encircling peripheral channel rotatably supported on an axis paralleling the axis of rotation of the disk knife, said peripherally channelled wheel being positioned to have the edge of the disk knife extend into the center of the channel, means for feeding fruit downwardly into said fruit receiving space, and means for feeding fruit onto the top of and into the channel of the peripherally channelled wheel said disk cutter functions to simultaneously cut fruit in the fruit receiving space and in the channel of the peripherally channelled wheel.

2. A machine for dividing fruits into sections, comprising two pairs of feeder wheels, one pair of wheels being in side by side relation with the other pair, the wheels of each pair being supported to turn on parallel axes and having their peripheries in opposed closely spaced relation, means for rotating the wheels of each pair in opposite directions, the adjacent portion of the peripheries of the two pairs of wheels forming a fruit receiving space, a rotary shaft supported in parallel relation with and at an elevation below the wheel shafts and in a vertical plane passing centrally between the opposing peripheries of the pairs of wheels, a disk knife supported on said shaft for rotation therewith and disposed in a vertical plane passing between the adjacent sides of the two pairs of wheels, a single wheel rotatably supported below two adjacent wheels of the two pairs for rotation on an axis paralleling said shaft and in close relation with the periphery of the knife, and means for effecting movement of fruit by said single wheel toward and into contact with the cutting edge of the knife whereby said disk knife functions to simultaneously cut fruit in the receiving space and fruit moved toward it by said single wheel.

EARL W. REICHART.

REFERENCES CITED

The following references are of record in the file of this patent:

UNITED STATES PATENTS

| Number | Name | Date |
|---|---|---|
| 770,957 | Briggs | Sept. 27, 1904 |
| 1,327,316 | Foley | Jan. 6, 1920 |
| 1,386,552 | Carney | Aug. 2, 1921 |
| 1,432,152 | Bornholdt | Oct. 17, 1922 |
| 1,499,950 | Smith | July 1, 1924 |
| 1,719,669 | Novak | July 2, 1929 |
| 1,970,274 | Brown | Aug. 14, 1934 |
| 2,103,383 | Russell | Dec. 28, 1937 |
| 2,226,071 | Oldenburg | Dec. 24, 1940 |
| 2,428,157 | Healy | Sept. 30, 1947 |